United States Patent
Moon

(10) Patent No.: US 6,661,485 B2
(45) Date of Patent: Dec. 9, 2003

(54) REFLECTIVE LIQUID CRYSTAL DISPLAY DEVICE USING A CHOLESTERIC LIQUID CRYSTAL COLOR FILTER

(75) Inventor: Jong-Weon Moon, Gyeonggi-do (KR)

(73) Assignee: LG. Philips LCD Co., Ltd., Seoul (KR)

(*) Notice: Subject to any disclaimer, the term of this patent is extended or adjusted under 35 U.S.C. 154(b) by 35 days.

(21) Appl. No.: 10/013,647

(22) Filed: Dec. 13, 2001

(65) Prior Publication Data
US 2002/0105609 A1 Aug. 8, 2002

(30) Foreign Application Priority Data
Feb. 7, 2001 (KR) .................. 10-2001-5973

(51) Int. Cl.[7] ............. G02F 1/1335; G02F 1/1333
(52) U.S. Cl. ............ 349/113; 349/106; 349/110
(58) Field of Search .............. 349/113, 106, 349/117, 110, 96, 9

(56) References Cited
U.S. PATENT DOCUMENTS
2001/0017680 A1 * 8/2001 Kim ................ 349/115

2001/0055089 A1 * 12/2001 Van De Witte et al. .... 349/185
2002/0018863 A1 * 2/2002 Ichihashi .................... 428/1.1
2002/0047965 A1 * 4/2002 Suzuki et al. ............... 349/113
2002/0051105 A1 * 5/2002 Yoon ......................... 349/106
2002/0167628 A1 * 11/2002 Yoon ......................... 349/106

FOREIGN PATENT DOCUMENTS
KR        2000-61782       3/1999

* cited by examiner

Primary Examiner—Tarifur R. Chowdhury
Assistant Examiner—Mike Qi
(74) Attorney, Agent, or Firm—Morgan Lewis & Bockius LLP

(57) ABSTRACT

A reflective liquid crystal display device include an upper substrate, a lower substrate, a liquid crystal layer interposed between the upper and lower substrates, a common electrode beneath the upper substrate, a plurality of orthogonal gate lines and data lines disposed on the lower substrate, a plurality of thin film transistors located near a crossing region of the gate and data lines, each of the plurality of thin film transistors include source and drain electrodes, a light absorption layer formed on each of the plurality of thin film transistors, a cholesteric liquid crystal color filter formed on the light absorption layer, and a plurality of pixel electrodes formed on the cholesteric liquid crystal color filter layer.

20 Claims, 5 Drawing Sheets

REFLECTIVE LIQUID CRYSTAL DISPLAY DEVICE USING A CHOLESTERIC LIQUID CRYSTAL COLOR FILTER

This application claims the benefit of Korean Patent Application No. 10-2001-0005973, filed on Feb. 7, 2001, which is hereby incorporated by reference.

BACKGROUND OF THE INVENTION

1. Field of the Invention

The present invention relates to a reflective liquid crystal display (LCD) device, and more particularly, to a reflective LCD device using a cholesteric liquid crystal color filter.

2. Description of the Related Art

Until recently, the cathode-ray tube (CRT) has been mainly used for display systems. However, flat panel displays are beginning to be implemented for display systems because of their small depth dimensions, desirably low weight, and low voltage power supply requirements. Currently, thin film transistor-liquid crystal displays (TFT-LCDs) with high resolution and small depth dimension are being developed.

Generally, conventional thin film transistor liquid crystal display (TFT-LCD) devices include an upper substrate and a lower substrate with a liquid crystal molecule layer interposed therebetween. The upper substrate and the lower substrate are generally referred to as a color filter substrate and an array substrate, respectively.

LCD devices use backlight sources disposed under the lower substrate to provide light. However, only about 7% of the light that is emitted by the backlight passes through each cell of the LCD devices. Since the backlight should emit light of a relatively high brightness, corresponding power consumption increases. Accordingly, a large capacity heavy battery is commonly used to supply sufficient power for the backlight. Moreover, use of the large capacity battery limits operating time.

Since power consumption of reflective LCD devices greatly decreases due to use of ambient light as a light source which increases operating time, reflective LCD devices are used for portable information apparatuses such as electric diaries and personal digital assistants (PDAs). In reflective LCD devices, a pixel area, which is covered with a transparent electrode in conventional transmissive LCD devices, is covered with a reflective plate or reflective electrode having opaque reflection characteristics. However, brightness of reflective LCD devices is very poor because the devices use only ambient light as a light source. The poor brightness results from operational characteristics of the reflective LCD devices, in which ambient light passes through a color filter substrate, is reflected on a reflective electrode on a lower substrate, passes through the color filter substrate again and then displays an image. Accordingly, brightness is decreased as a result of reduction of the transmittance when the ambient light passes through the color filter substrate twice. Since overall thickness of the color filter substrate is inversely proportional to transmittance and is directly proportional to color purity of the light, the problem of inadequate brightness of the reflective LCD devices can be remedied by forming a thin color filter with high transmittance and low color purity. However, there is a limit in fabricating the color filter below a threshold thickness due to characteristics of the resin used to form the color filter. Accordingly, one possible solution to this problem is forming LCD devices using cholesteric liquid crystals (CLCs) having selective reflection and transparency characteristics.

In reflective LCD devices using a CLC color filter layer, the fabrication processes are simplified due to omission of the reflective layer, and a high color purity and high contrast ratio is achieved. Moreover, since CLCs have a spiral structure and spiral pitch determines a selective reflection bandwidth of the CLCs, the reflection bandwidth can be controlled by a distribution of the spiral pitch at one pixel. To illustrate this in more detail, a wavelength range of visible light is from about 400 nm to 700 nm. The wavelength of the red light region is centered at about 650 nm, the wavelength of the green light region is centered at about 550 nm, and the wavelength of the blue light region is centered at about 450 nm. The CLC color filter is formed having characteristics that can selectively reflect or transmit right-handed or left-handed circularly polarized light at a bandwidth that corresponds to a pitch deviation by selecting bandwidths corresponding to the red, green, and blue light regions. In addition, the CLC color filter is formed having characteristics that control conditions for right or left pitch deviations with respect to the center wavelength. Accordingly, the pitch of the liquid crystal can be artificially adjusted so that a CLC color filter can selectively reflect light of an intrinsic wavelength of the color corresponding to each pixel.

FIG. 1 is a schematic cross-sectional view of a conventional reflective LCD device using a CLC color filter. The LCD device is an active matrix liquid crystal display (AMLCD) in which one TFT, which is an on/off switching device of a pixel voltage, controls a voltage of the liquid crystal of one pixel and adjusts transmittance of the pixel. In FIG. 1, upper and lower substrates 10 and 30 face each other and are spaced apart with a liquid crystal layer 50 interposed therebetween. At the bottom of the transparent substrate 1 of the upper substrate, a TFT "T" is formed. Beneath the TFT "T," a pixel electrode 16 connected to the TFT "T" is formed in each pixel area. Beneath the pixel electrode 16, a black matrix 14 that screens light of non-operating areas of the liquid crystal is formed. At the top of the transparent substrate 1, a quarter wave plate (QWP) 18 and a polarization plate 20 are sequentially layered. On the transparent substrate 1 of the lower substrate 30, the CLC color filter 32, which reflects light of the bandwidth corresponding to the red, green, and blue regions and transmits light of other bandwidths, is formed. Beneath the CLC color filter 32, a light absorption layer 34 that absorbs the transmitted light through the CLC color filter 32 is formed. Upon the CLC color filter 32, a common electrode 36 is formed for applying an electric field to the liquid crystal layer 50 along with the pixel electrode 16. Reflective LCD devices using the conventional CLC color filter include the TFT, pixel electrode, and black matrix formed on the upper substrate with the CLC color filter and light absorption layer being formed on the lower substrate.

The following descriptions demonstrate relationships of aperture ratio of a pixel electrode of a reflective LCD device. The aperture ratio is related to brightness and a ratio of effective pixel area to total display area. The higher the aperture ratio, the higher the brightness. Furthermore, since the aperture ratio of reflective LCD devices is related to the brightness of the reflected light that determines characteristics of the devices, it is necessary to increase the aperture ratio of the reflective LCD devices.

FIG. 2 is a schematic plane view of the upper substrate of FIG. 1. In FIG. 1, a matrix structure is formed by orthogonal gate and data lines 11 and 13. A pixel electrode 16 is formed in a pixel area which is defined by the intersections of the gate line 11 and data line 13. A TFT "T" is formed to be connected to the pixel electrode 16 and a black matrix 14 is formed at an oblique-lined region. Since the pixel electrode 16 is formed separately from the gate line 11 and data line 16 in order to avoid any electrical interference therebetween, the aperture ratio is less than about 80%. Moreover, the black matrix 14 is formed overlapping an edge portion of the pixel electrode 16 to prevent light leakage at the edge of the pixel electrode caused by any cross-talk generated between the pixel electrode 16 and the data line 14, thereby deteriorating display quality. Consequently, since a total area of the pixel electrode 16 is not used as an operating area of the display in the reflective LCD device, this causes the deterioration in the brightness of the reflected light.

BRIEF SUMMARY OF THE INVENTION

Accordingly, the present invention is directed to a reflective liquid crystal display device that substantially obviates one or more of the problems due to limitations and disadvantages of the related art.

An object of the present invention is to improve a display quality of a reflective LCD device.

Another object of the present invention is to increase a pixel area of a reflective LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes an upper substrate, a lower substrate, a liquid crystal layer interposed between the upper and lower substrates, a common electrode beneath the upper substrate, a plurality of orthogonal gate lines and data lines disposed on the lower substrate, a plurality of thin film transistors, each of the thin film transistors disposed adjacent to a crossing region of the gate and data lines and include source and drain electrodes, a light absorption layer formed on each of the plurality of thin film transistors, a cholesteric liquid crystal color filter layer formed on the light absorption layer, and a plurality of pixel electrodes formed on the cholesteric liquid crystal color filter layer.

In another aspect, a method of fabricating a reflective liquid crystal display device includes steps of forming upper and lower substrates, forming a liquid crystal layer interposed between the upper and lower substrates, forming a common electrode beneath the upper substrate, forming a plurality of orthogonal gate and data lines on the lower substrate, forming a plurality of thin film transistors, each thin film transistor disposed adjacent to a crossing region of the plurality of gate and data lines and include source and drain electrodes, forming a light absorption layer on the thin film transistors, forming a cholesteric liquid crystal color filter layer on the light absorption layer, and forming a plurality of pixel electrodes on the cholesteric liquid crystal color filter layer.

In another aspect, a reflective liquid crystal display device includes an upper substrate, a lower substrate, a liquid crystal layer interposed between the upper and lower substrates, a common electrode beneath the upper substrate, a plurality of orthogonal gate lines and data lines disposed on the lower substrate, a light absorption layer formed on the plurality of orthogonal gate and data lines, a plurality of thin film transistors located adjacent a crossing region of the gate and data lines and embedded within the light absorption layer, each of the plurality of thin film transistors include source and drain electrodes, a cholesteric liquid crystal color filter layer formed on the light absorption layer, and a plurality of pixel electrodes formed on the cholesteric liquid crystal color filter layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
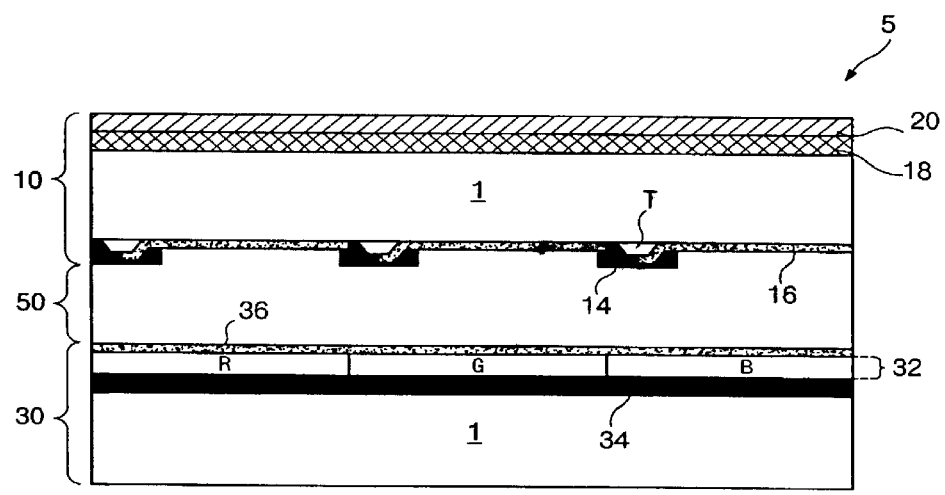
FIG. 1 is a schematic cross-sectional view of a part of a reflective LCD device using a conventional CLC color filter.
Figure 2:
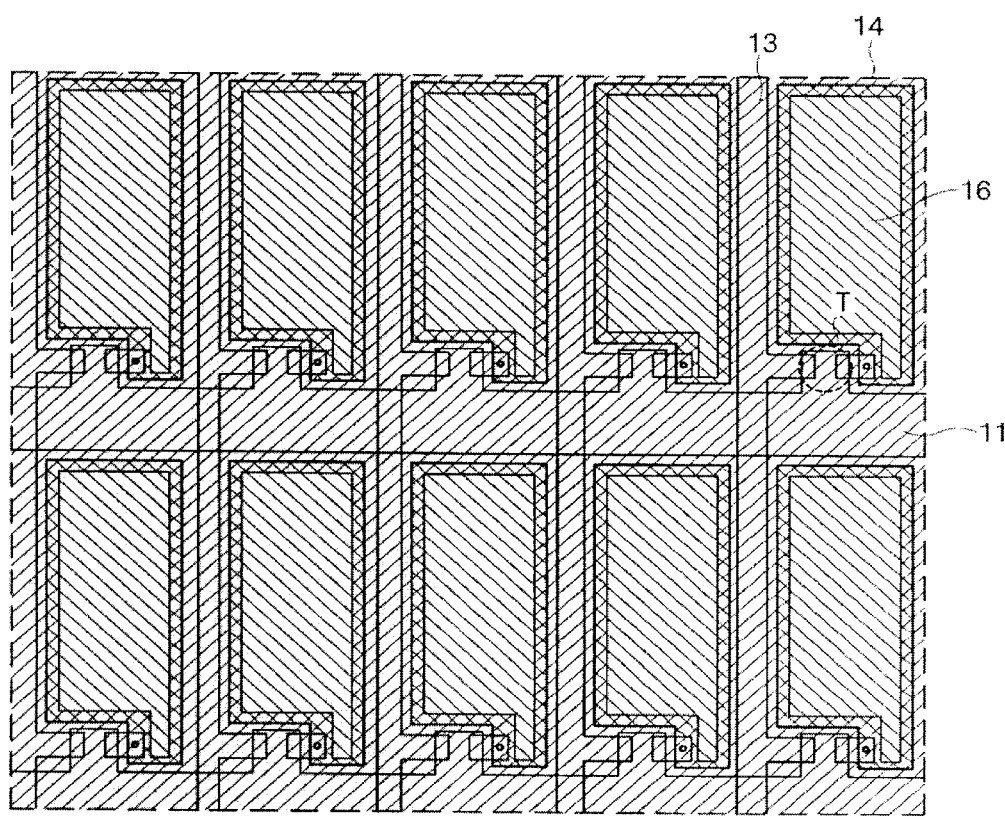
FIG. 2 is a schematic plane view of the upper substrate of FIG. 1.
Figure 3:
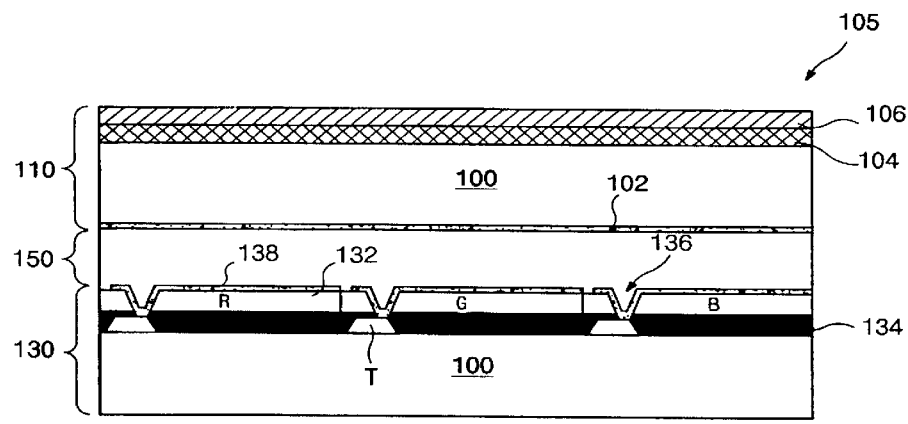
FIG. 3 is a schematic cross-sectional view of a part of an exemplary reflective LCD device using the CLC color filter according to the present invention.

FIG. 3 is a schematic cross-sectional view of a part of an exemplary reflective LCD device using a CLC color filter according to the present invention. In FIG. 3, upper and lower substrates 110 and 130 face each other and are spaced apart by a liquid crystal layer 150 interposed therebetween. The liquid crystal layer may include at least a nematic liquid crystal, wherein liquid crystal molecules are aligned along one direction. A common electrode 102, which applies a voltage to the liquid crystal layer 150, may be formed beneath a transparent substrate 100 of the upper substrate 110. A quarter wave plate (QWP) 104, which is a $\lambda/4$ retardation film that converts linearly polarized light to circularly polarized light or circular polarized light to linearly polarized light by a $\lambda/4$ phase difference, may be disposed on the transparent substrate 100. A polarization plate 106, which transmits only linearly polarized portions of light with the same polarization axis of the incident light, may be disposed on the QWP 104.

A thin film transistors (TFT) "T" may be formed on the transparent substrate 100 of the lower substrate 130 and a cholesteric liquid crystal (CLC) color filter layer 132, which reflects light of a bandwidth corresponding to colors of red (R), green (G) and blue (B) and transmits the light of other bandwidths, is formed on the TFT "T." A light absorption layer 134, which absorbs light transmitted through the CLC color filter layer 132, may be interposed between the TFT "T" and the CLC color filter layer 132. The CLC color filter layer 132 and the absorption layer 134 may include contact holes 136 that partially expose a drain electrode of the TFT "T." A pixel electrode 138, which may be electrically connected to the TFT "T" through the contact holes 136, may be formed on the CLC color filter layer 132.

Since the absorption layer 134 and the CLC color filter layer 132 may be interposed between the TFT "T" and the pixel electrode 138 and the absorption layer 134, an area corresponding to the pixel electrode 138 can be increased to the CLC color filter layer 132, whereby most of the pixel electrode 138 can be used for a display area. Accordingly, the aperture ratio of the reflective LCD device can be increased.

Figure 4:
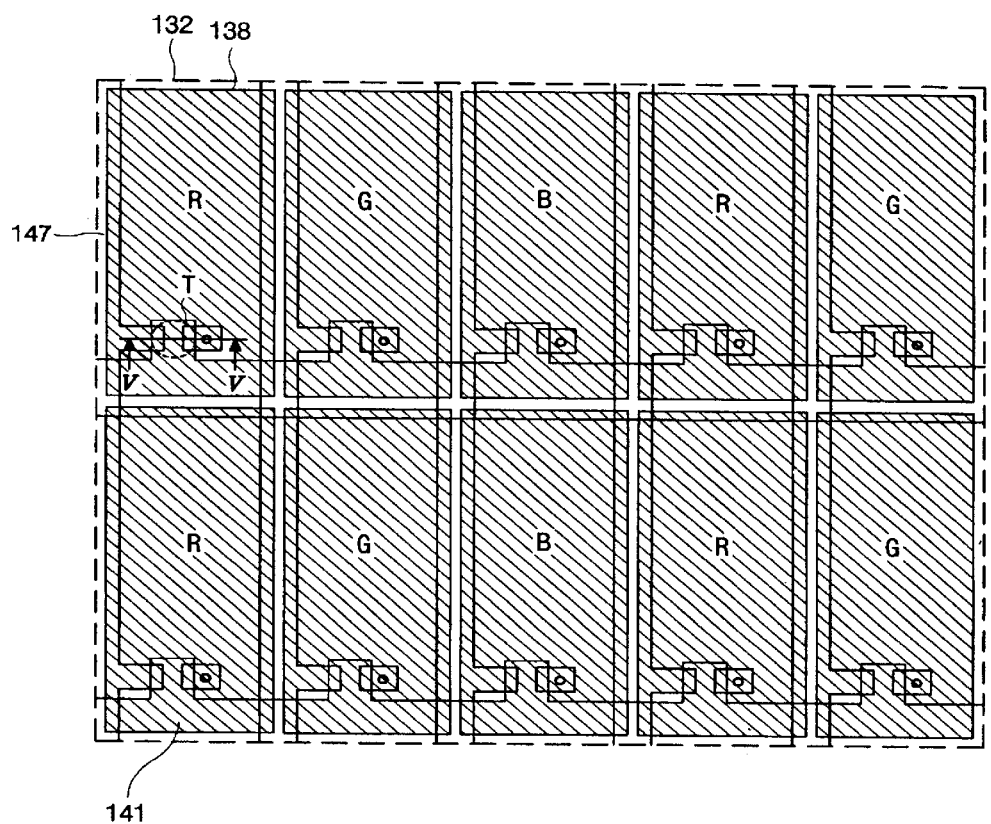
FIG. 4 is a schematic plane view of an exemplary lower substrate of FIG. 3.

FIG. 4 is a schematic plane view of the lower substrate of FIG. 3. In FIG. 4, a matrix structure may be formed by the orthogonal gate and data lines 141 and 147. The TFT "T" may be formed at an edge of the pixel area that is defined by the gate and data lines 141 and 147. The CLC color filter layer 132 may be formed at the corresponding pixel area to display colors of red, green, and blue, respectively. The pixel electrode 138 may be formed at an area corresponding to the CLC color filter layer 132 and connected to the TFT "T" through the contact hole 136. Since the CLC color filter layer 132 and the light absorption layer (not shown) may be interposed between the pixel electrodes 138 and the TFTs "T," each pixel electrode 138 may overlap with the gate and data lines 141 and 147 and may be formed within an area corresponding to the CLC color filter layer 132. Any electric interference that may occur between the gate and data lines 140 and 142 and the pixel electrodes 138 can be prevented by forming the light absorption layer 134 (FIG. 3) and the CLC color filter layer 132 to relatively large thicknesses. Each pixel electrode 138 is spaced apart from each other since the TFT "T" applies an individual signal to each pixel electrode 138.

Figure 5:
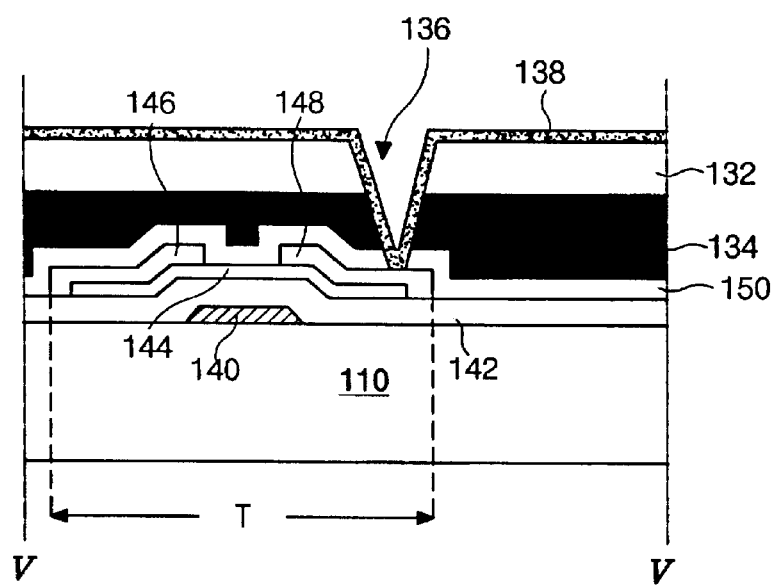
FIG. 5 is a schematic cross-sectional view taken along V—V of FIG. 4.

FIG. 5 is a schematic cross-sectional view taken along V—V of FIG. 4. Specifically, a detailed structure of the TFT "T" and multiple layer structure of the CLC color filter layer 132, the light absorption layer 134 and the pixel electrode 138 are illustrated. In FIG. 5, the gate electrode 140 is formed on the transparent substrate 110; the gate insulator 142 is formed on the gate electrode 140 over entire surface of the transparent substrate 110, a semiconductor layer 144 is formed on the gate insulator 140, source and drain electrodes 146 and 148 are spaced apart from each other on the semiconductor layer 144, the passivation layer 150 having a contact hole that partially exposes the drain electrode of 148 is formed on the source and drain electrodes 146 and 148 over the entire surface of the transparent substrate 110, and the light absorption layer 134 and the CLC color filter layer 132 having a hole corresponding to the contact hole 136 are formed on the passivation layer 150. The pixel electrode 138 is formed within the pixel area and is connected to the drain electrode 148 through the contact hole 136. Since the light absorption layer 134 absorbs light of the non-selected bandwidth of the CLC color filter layer 132 and confines the light of the non-pixel area and screens incident light into the top of the TFT "T," the aperture ratio can be increased more than about 90% by forming the pixel electrode 138 to overlap with the array layer including the TFT "T," thereby using most of the area of the pixel for a display area.

Figure 6:
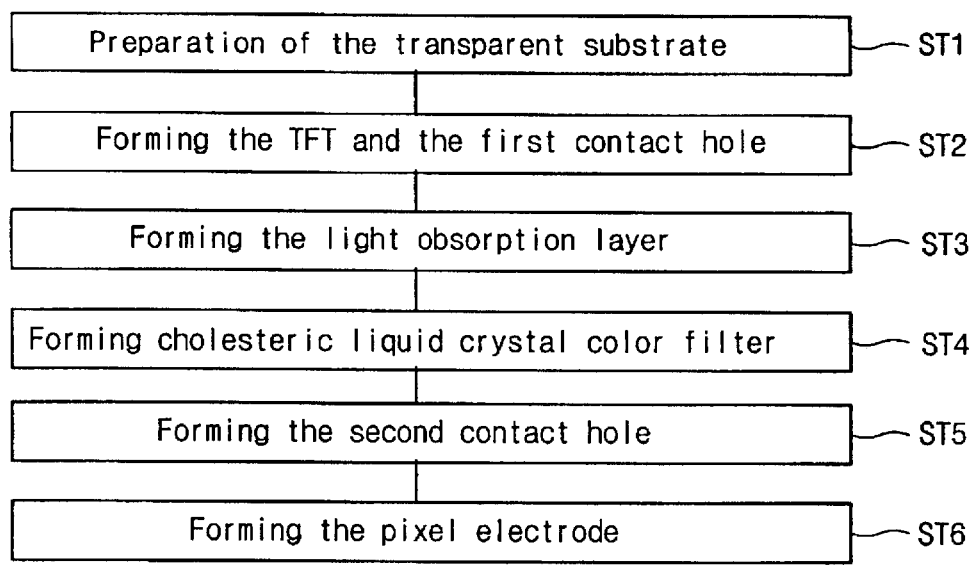
FIG. 6 is a flow chart of an exemplary method of fabricating a lower substrate of a reflective LCD device using a CLC color filter according to the present invention.

FIG. 6 is a flow chart of an exemplary fabrication method for forming the lower substrate of the reflective LCD device using the CLC color filter layer according to the present invention.

At steps ST1 and ST2, a transparent substrate is prepared, and TFTs and first contact holes are formed on the transparent substrate. The TFTs have a structure shown in FIG. 5, and the first contact holes are formed at a passivation layer that is an upper layer of the TFTs. Since the fabrication process for forming the first contact holes is included with the process of forming contact holes of the other devices for connection between exterior circuits and the LCD device and does not require an additional fabrication processes, the fabrication process that forms the first contact holes before formation of second contact holes in the CLC color filter layer and the light absorption layer is preferable for the contact hole etching fabrication process.

At step ST3, a light absorption layer is formed on the structure formed during step ST2. The light absorption layer absorbs light of non-selected bandwidths in the CLC color filter, prevents light of non-pixel areas from outflowing, and prevents ambient light from inflowing into the TFTs. The material of the absorption layer may include heavy molecules with high light-absorption rates such as black resin. The black resin may be formed from an acrylic resin mixed with a carbon or black pigment.

At step ST4, the CLC color filter layer may be formed on the light absorption layer through fabrication steps of coating, baking at a suitable temperature, and hardening, for example. The red, green, and blue CLC color filters may be pitchadjusted fitting to bandwidths corresponding to red, green, and blue to display colors by the pixel unit.

At step ST5, the second contact holes may be formed at positions corresponding to the first contact holes of the passivation layer and connect the TFTs to pixel electrodes. The second contact holes can be made by a dry etching method, for example, mainly used in etching of organic materials, and formed on the light absorption layer and the CLC color filter, respectively, for stability of the etching process.

At step ST6, the pixel electrode may be formed to be connected to the TFTs through the second contact holes with the corresponding area to the CLC color filter layer. Since the pixel electrode is disposed at a crossing area of the gate and data lines, the aperture ratio of the LCD devices is less than about 80%. However, since the light absorption layer and the CLC color filter layer are formed between the array layer, which includes the gate, data lines and the TFTs, and the pixel electrode, any electric interference between the pixel electrode, the gate lines, and the data lines can be prevented. Furthermore, the pixel electrode may be formed to overlap with the gate and data lines since the light absorption layer functions as the black matrix. Consequently, the aperture ratio can be increased by more than about 90% and the reflected-light brightness of the CLC color filter can also be increased as a result of the increased pixel electrode area.

Therefore, the reflective LCD devices according to the present invention, in which the CLC color filter, the light absorption layer and the TFTs are disposed on the same substrate, have some advantages. First, since the light absorption layer screens the light of non-pixel area by forming the CLC color filter and the light absorption layer as the lower layer of the lower substrate and forming the pixel electrode as the upper layer the lower substrate, additional fabrication processes for forming the black matrix is not necessary. Second, since most of the pixel area can be used as the operating area of the display, the aperture ratio and the brightness of the reflected light can be increased, thereby improving the quality of the reflective LCD devices.

It will be apparent to those skilled in the art that various modifications and variations can be made in the reflective and transmissive liquid crystal display devices having black resin of the present invention without departing from the spirit or scope of the invention. Thus, it is intended that the present invention covers the modifications and variations of this invention provided they come within the scope of the appended claims and their equivalents.

What is claimed is:

1. A reflective liquid crystal display device, comprising:
an upper substrate;
a lower substrate;
a liquid crystal layer interposed between the upper and lower substrates;
a common electrode beneath the upper substrate;
a plurality of orthogonal gate lines and data lines disposed on the lower substrate;
a plurality of thin film transistors, each of the thin film transistors disposed adjacent to a crossing region of the gate and data lines and including source and drain electrodes;
a light absorption layer formed on each of the plurality of thin film transistors;
a cholesteric liquid crystal color filter layer formed on the light absorption layer; and
a plurality of pixel electrodes formed on the cholesteric liquid crystal color filter layer.

2. The device according to claim 1, wherein each of the plurality of pixel electrodes is connected to the drain electrodes of the thin film transistors through contact holes formed in the cholesteric liquid crystal color filter layer.

3. The device according to claim 1, wherein the liquid crystal layer includes a nematic liquid crystal.

4. The device according to claim 1, further comprising linear polarization and linear retardation plates disposed on the upper substrate.

5. The device according to claim 4, wherein the linear retardation plate is a quarter wave plate.

6. The device according to claim 4, wherein the common electrode is formed between the linear retardation plate and the plurality of pixel electrodes.

7. The device according to claim 1, wherein the cholesteric liquid crystal color filter layer is disposed between the light absorption layer and each of the plurality of pixel electrodes.

8. The device according to claim 7, wherein each of the plurality of pixel electrodes is connected to the drain electrodes of the thin film transistors through contact holes formed in the cholesteric liquid crystal color filter layer.

9. The device according to claim 1, wherein each of the plurality of thin film transistors is disposed adjacent to the lower substrate.

10. A method of fabricating a reflective liquid crystal display device, comprising the steps of:
forming upper and lower substrates;
forming a liquid crystal layer interposed between the upper and lower substrates;
forming a common electrode beneath the upper substrate;
forming a plurality of orthogonal gate and data lines on the lower substrate;
forming a plurality of thin film transistors, each thin film transistor disposed adjacent to a crossing region of the plurality of gate and data lines and including source and drain electrodes;
forming a light absorption layer on the thin film transistors;
forming a cholesteric liquid crystal color filter layer on the light absorption layer; and
forming a plurality of pixel electrodes on the cholesteric liquid crystal color filter layer.

11. The method according to claim 10, wherein each of the plurality of pixel electrodes is connected to the drain electrodes of the thin film transistors through contact holes formed in the cholesteric liquid crystal color filter layer.

12. The method according to claim 10, wherein the liquid crystal layer includes a nematic liquid crystal.

13. The method according to claim 10, further comprising the step of forming linear polarization and linear retardation plates on the upper substrate.

14. The method according to claim 13, wherein the common electrode is formed between the linear retardation plate and the plurality of pixel electrodes.

15. The method according to claim 13, wherein the linear retardation plate is a quarter wave plate.

16. The method according to claim 10, wherein each of the plurality of thin film transistors is disposed adjacent to the lower substrate.

17. A reflective liquid crystal display device, comprising:
an upper substrate;
a lower substrate;
a liquid crystal layer interposed between the upper and lower substrates;
a common electrode beneath the upper substrate;
a plurality of orthogonal gate lines and data lines disposed on the lower substrate;
a light absorption layer formed on the plurality of orthogonal gate and data lines;
a plurality of thin film transistors located adjacent a crossing region of the gate and data lines and embedded within the light absorption layer, each of the plurality of thin film transistors including source and drain electrodes;
a cholesteric liquid crystal color filter layer formed on the light absorption layer; and
a plurality of pixel electrodes formed on the cholesteric liquid crystal color filter layer.

18. The device according to claim 17, wherein each of the plurality of pixel electrodes is connected to the drain electrodes of the thin film transistors through contact holes formed in the cholesteric liquid crystal color filter layer.

19. The device according to claim 17, wherein the liquid crystal layer includes a nematic liquid crystal.

20. The device according to claim 17, further comprising linear polarization and linear retardation plates disposed on the upper substrate.

* * * * *